United States Patent
Zobel et al.

[11] Patent Number: 5,937,575
[45] Date of Patent: Aug. 17, 1999

[54] AEROPONIC GROWTH SYSTEM WITH NUTRIENT FOG STABILIZATION

[75] Inventors: Richard W. Zobel, Lewisburg, W. Va.; Richard F. Lychalk, Trumansburg, N.Y.

[73] Assignee: The United States of America, as represented by the Secretary of Agriculture, Washington, D.C.

[21] Appl. No.: 09/179,792

[22] Filed: Oct. 27, 1998

[51] Int. Cl.$^6$ .................................................. A01G 31/02
[52] U.S. Cl. ........................ 47/62 A; 261/81; 250/339.13
[58] Field of Search .................................... 47/60, 62, 59, 47/58; 261/1, 81, DIG. 48; 250/339.1, 339.13; 73/335.01; 472/65

[56] References Cited

U.S. PATENT DOCUMENTS

| | | | |
|---|---|---|---|
| 3,091,690 | 5/1963 | McHenry | 250/339.13 |
| 3,991,514 | 11/1976 | Finck | 47/1.2 |
| 4,332,105 | 6/1982 | Nir | 47/1 R |
| 4,514,930 | 5/1985 | Schorr et al. | 47/60 |
| 4,584,791 | 4/1986 | Wolf | 47/62 |
| 4,669,217 | 6/1987 | Fraze | 47/64 |
| 4,721,250 | 1/1988 | Kennedy et al. | 239/383 |
| 4,813,176 | 3/1989 | Takayasu | 47/59 |
| 4,869,019 | 9/1989 | Ehrlich | 47/62 |
| 5,136,804 | 8/1992 | Rothem et al. | 47/60 |
| 5,393,426 | 2/1995 | Raskin et al. | 47/58 |
| 5,407,604 | 4/1995 | Luffman | 261/4 |
| 5,888,137 | 11/1998 | Liao | 239/339.13 |

OTHER PUBLICATIONS

Ciacomelli, G.A. and Smith, S., "Fog for Aeroponic Plant Production," (1989) *Soilless Culture* V(1):13–22.
Hessel, M.I. et al., "Airflow–Contained Aeroponic Nutrient Delivery for a Microgravity Prant [sic] Growth Unit," (1992) *Biotronics* 21:33–38.
Peterson, L.A. and Krueger, A.R., "An Intermittent Aeroponics System," (1988) *Crop Science* 28:712–713.
Soffer, H. and Burger, D.W., "Rooting Cuttings in Aero–Hydroponics," (1989) *Flower& Nursery Report for Commercial Growers*, pp. 1–2.

(List continued on next page.)

*Primary Examiner*—Robert P. Swiatek
*Assistant Examiner*—Jeffrey L. Gellner
*Attorney, Agent, or Firm*—M. Howard Silverstein; John D. Fado; Janelle S. Graeter

[57] ABSTRACT

This invention provides apparatus and methods for stabilization of ultrasonically generated nutrient fog. To eliminate the sensitivity to the humidity and temperature of the intake air, the fog is recirculated from the growth chamber to the fog-generating reservoir. The chamber and reservoir are connected by a fog supply conduit and a fog return conduit which form a fog circulation circuit. The recirculation eliminates the fog density dependence on intake air humidity and stabilizes the amount of nutrients used. To monitor the fog density, this invention provides an optical fog density detector that operates by measuring the absorbance of the fog. The density detector can be coupled with the fog generator so that the rate of fog generation is responsive to the measured fog density. The detector can be coupled with an alarm to signal fog generator malfunction. This invention also provides fog concentration stabilization by using a large ballast reservoir connected to a fog-generating reservoir. Recirculation of nutrient solution between the fog-generating reservoir and the larger ballast reservoir mitigates increased salt concentration in the solution due to evaporation of water, thus allowing longer periods of continuous operation. Nutrient solution drains from the fog-generating reservoir into the ballast reservoir at a regulated rate. Replacement solution is transferred from the ballast reservoir to the fog-generating reservoir. The recirculating system can include a solution replacement indicator. Additionally, the recirculating nutrient solution can pass through ion exchange resins that maintain nutrient concentrations and solution pH within desired ranges.

25 Claims, 1 Drawing Sheet

OTHER PUBLICATIONS

Weathers, P.J. and Zobel, R.W., "Aeroponics for the Culture of Organisms, Tissues and Cells," (1992) *Biotech. Adv.* 10:93–115.

Weathers, P.J. and Giles, K.L., "Regeneration of Plants Using Nutrient Mist Culture," (1988) *In Vitro Cellular & Developmental Biology* 24(7):727–732.

Zobel, R.W. et al., "Method for Growing Plants Aeroponically," (1976) *Plant Physiol.* 57:344–346.

AEROPONIC GROWTH SYSTEM WITH NUTRIENT FOG STABILIZATION

FIELD OF THE INVENTION

This invention relates to nutrient fog stabilization in an aeroponic growth system having an ultrasonic fog generator.

BACKGROUND OF THE INVENTION

Aeroponic growth systems provide many advantages for agricultural research and production. The plant tissue is placed in a growth chamber and is moistened with a nutrient fog. For seedlings, the roots are in a separate part of the chamber from the foliage. The roots are maintained in a dark, nutrient fog-filled portion of the growth chamber and the foliage is maintained in an illuminated portion of the chamber. For optimum growth, control of the nutrient fog density and composition is required.

Most commonly the nutrient fog is generated by misting nozzles in the growth chamber, which are turned on at timed intervals. There are several disadvantages to this method of fog production. Surplus nutrient solution collects at the bottom of the growth chamber and is either discarded, thereby requiring greater nutrient use, or recycled, at the risk of contamination. The fog production is intermittent so the operating conditions cannot be stable. Because of the droplet size the roots can become coated with a water layer which interferes with nutrient absorption. Accumulation of nutrient salts on the nozzles requires frequent cleaning and maintenance.

Ultrasonic fog generation overcomes many problems of spray-based fog generation. An ultrasonic transducer is positioned in the bottom of a nutrient solution reservoir and a nutrient fog forms above the liquid. The reservoir can either be in the bottom of the growth chamber or the reservoir can be separate from the growth chamber and the fog can be carried into the growth chamber by a stream of air. Little surplus nutrient solution collects in the growth chamber, the ultrasonic transducer can be operated continuously, and the droplets are small enough that a water layer does not form on the roots.

Nonetheless there are several factors which prevent stable ultrasonic fog generation. Recognition of these factors is one aspect of the present invention. The humidity level of ultrasonically produced fog is 100%. When fresh air is passed over the nutrient solution reservoir, the humidity level of the air determines how much of the nutrient solution is vaporized to increase the humidity back to 100% and how much is atomized into fog. Changes in the humidity and temperature of the intake air change the nutrient concentration in the fog. Additionally, as the nutrient solution reservoir is depleted, due to vaporization and atomization of the nutrient solution combined with resultant precipitation of nutrients from the fog, the salt concentration in the nutrient solution reservoir increases significantly. The fog can become so concentrated that it is toxic to plants.

SUMMARY OF THE INVENTION

This invention provides apparatuses and methods for stabilization of ultrasonically generated nutrient fog. To eliminate sensitivity to the humidity and temperature of the intake air, the fog is recirculated from the growth chamber to the fog-generating system. The recirculation eliminates the fog density dependence on intake air humidity and stabilizes the amount of nutrients used. To monitor the fog density, this invention provides an optical fog density detector that operates by measuring the absorbance of the fog. The density detector is coupled with the fog generator so that the rate of fog generation is responsive to the measured fog density. This invention also provides fog concentration stabilization by using a large ballast reservoir in addition to a fog-generating reservoir. Recirculation of nutrient solution between the fog-generating reservoir and the larger ballast reservoir mitigates the increased salt concentration in the solution due to evaporation of water, thus allowing longer periods of continuous operation.

The recirculating fog aeroponic growth system of this invention comprises an aeroponic growth chamber and a fog-generating reservoir. The chamber and reservoir are connected by a fog supply conduit and a fog return conduit which form a fog circulation circuit. A fan is positioned in the circuit to circulate the fog between the reservoir and the growth chamber. A gas can also be introduced to the circulation circuit. The gas can be a nutrient or hormone gas, such as carbon dioxide or ethylene, or it can be air. The air can be ambient air or the air can be preconditioned to a desired humidity or temperature. The gas inlet can include a flow regulator for controlling the dilution of recirculated fog, and thereby the fog density. The flow regulator can be coupled with a density detector system.

The fog density detector system of this invention is designed for use with a system having a fog generator. The fog density is detected preferably by using a light source and a photodetector to measure the absorbance of the fog, which is proportional to the density. The detector system further comprises a fog-generator controller which may be a computer or operatively connected to a computer which is also operatively connected to the fog generator to adjust the rate of fog generation in response to the measured fog density. If the fog generator is an ultrasonic fog generator having an ultrasonic transducer, the fog-generator controller can be used to activate the transducer. For the recirculating fog growth system having an additional gas inlet, the fog-generator controller can be coupled with a flow regulator on the gas inlet. If the fog generator uses mist spray nozzles, the fog-generator controller can activate the spray. The detector can be coupled with an alarm to signal fog generator malfunction.

The nutrient solution recirculating fog-generating system has a fog-generating reservoir with an ultrasonic transducer positioned therein. The fog-generating reservoir is connected to a ballast reservoir having a volume substantially greater than the fog-generating reservoir. Nutrient solution drains from the fog-generating reservoir into the ballast reservoir at a regulated rate. Replacement solution is transferred from the ballast reservoir to the fog-generating reservoir. The volume of the ballast reservoir is sufficient to maintain a substantially constant concentration of nutrients in the solution in the fog-generating reservoir. This mitigates the buildup of salts that occurs through salt precipitation in the nutrient solution. The use of a ballast reservoir increases fog stability, conserves nutrients and reduces the frequency of solution replacement. Although increased operating time can also be achieved by using a large volume fog-generating reservoir, a smaller volume fog-generating reservoir in combination with the ballast reservoir has several advantages. Ultrasonic energy is more readily coupled with a smaller volume. The solution in the larger ballast reservoir can be replaced without interrupting operation of the transducer in the fog-generating reservoir. To control the fog temperature, the nutrient solution can be heated. A smaller volume reservoir can be heated and cooled more rapidly.

The nutrient solution recirculation allows prolonged operation before the nutrients in the fog-generating chamber become so concentrated that they produce fog that is toxic to tissue. The recirculating system can include a solution replacement indicator. The salt concentration can be measured electrically or chemically. The buildup of contaminants can also be measured chemically. Additionally, the recirculating nutrient solution can pass through ion exchange resins that maintain nutrient concentrations and solution pH within the desired ranges.

For fog stabilization, the recirculating fog aeroponic growth system is preferably used in combination with the fog density detector, and most preferably used in further combination with nutrient solution recirculation.

This invention also provides a method for controlling the density of a fog using the apparatuses of this invention comprising electrically coupling a fog-generator controller to such apparatuses so as to maintain the density of the generated fog at a desired level.

DETAILED DESCRIPTION OF THE INVENTION

Figure 1:
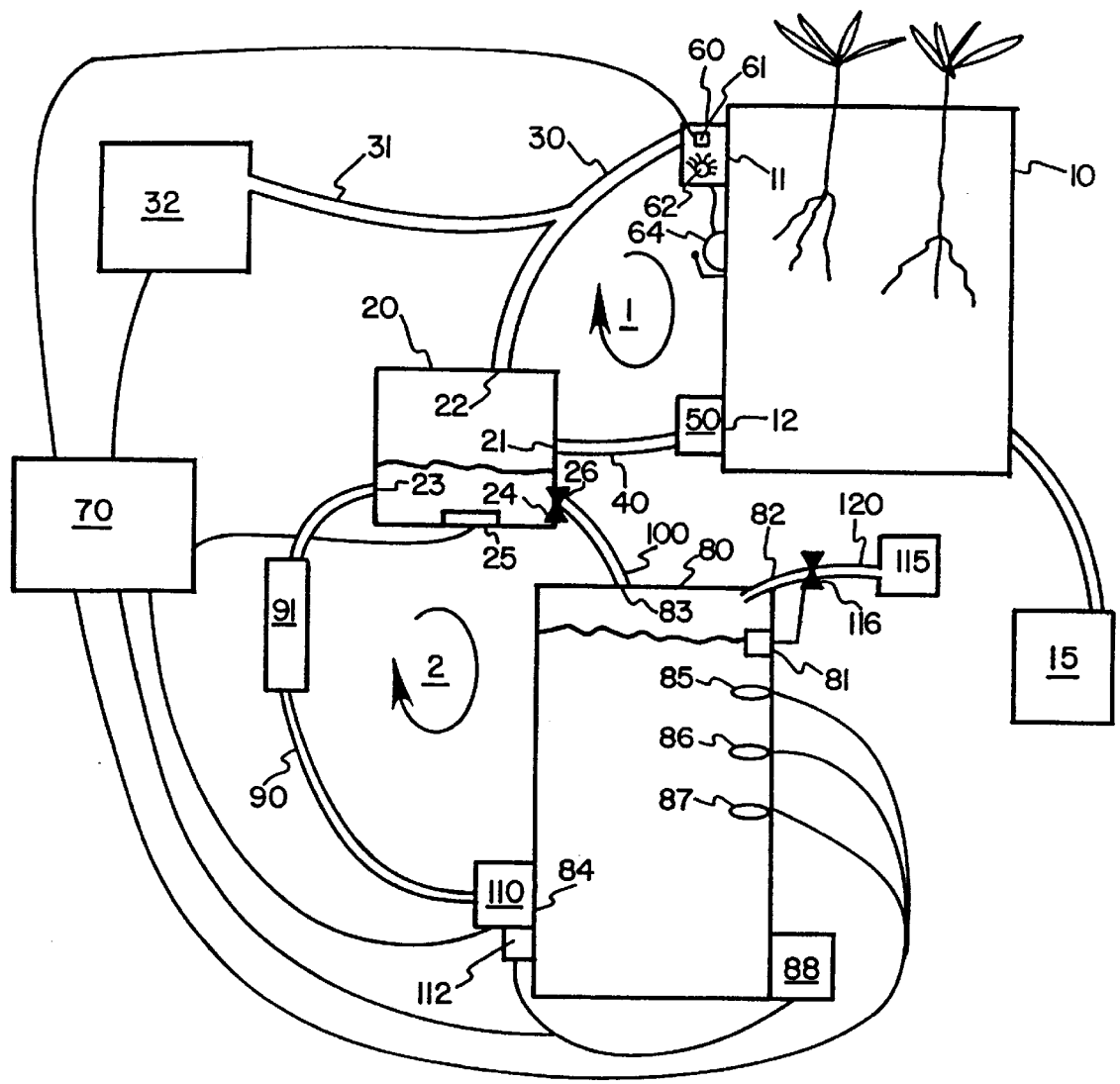
FIG. 1 is an aeroponic growth system having to a fog circulation circuit and a solution circulation circuit.

This invention can be understood more thoroughly with reference to the drawing, which is illustrative of the invention but not limiting. The aeroponic growth system of FIG. 1 has a growth chamber 10 in which tissue can be placed for growth or other treatment. For plant growth the roots, but preferably not the foliage, are positioned in the chamber. The growth chamber is part of fog circulation circuit 1. The fog circulation circuit includes a fog-generating system (fog generator) having fog-generating reservoir 20. The lower portion of the reservoir is defined as the portion filled with a solution, such as a nutrient solution, which covers ultrasonic transducer 25. The transducer energizes the solution and creates fog in the upper portion of the reservoir. A single transducer is illustrated. A plurality of transducers can be utilized and they can be positioned anywhere within the solution or in mechanical contact with the solution. Fog supply conduit 30 carries the fog from reservoir fog outlet 22 to growth chamber fog inlet 11. Fog return conduit 40 carries fog from growth chamber fog outlet 12 to reservoir fog inlet 21. The fog-generating reservoir 20, the growth chamber 10 and the fog supply and return conduits 30 and 40 form fog circulation circuit 1. Fan 50 is positioned in the circuit to promote fog circulation. In the illustrated embodiment the fan is positioned at the fog outlet 12 of the growth chamber. It can be positioned anywhere along the fog circulation circuit.

Fog circulation between the growth chamber 10 and the fog-generating system is distinct from the nutrient solution recirculation therebetween known in the art. In growth systems utilizing spray nozzles for fog generation there is significant condensation of nutrient solution in the bottom of the growth chamber. The accumulated solution can be recirculated to the mist nozzles. In the growth system of the present invention, using ultrasonically generated fog there is little accumulation of condensed nutrient solution in the growth chamber 10. Condensed solution can be drained to waste container 15. It can alternatively be returned to the fog-generating reservoir, but it is preferably discarded to prevent contamination.

Recirculating the fog stabilizes the nutrient consumption by the growth system. Recirculation provides a relatively constant humidity gas input at the inlet to the fog-generating reservoir 20. This stabilization can alternatively be achieved by using a controlled humidity gas intake to the fog-generating reservoir 20, for example by using a pretreatment humidifier. In the circulation circuit, the fog density can further be controlled by adding gas to the circuit. In FIG. 1, gas inlet 31 is coupled with the fog supply conduit 30. The gas inlet 31 can alternatively join the fog circulation circuit following the growth chamber 10 and before the fog generating reservoir 20. The gas inlet 31 has flow regulator 32 connected thereto. The gas can be ambient air, pressurized air, or any other gas, such as carbon dioxide gas.

A fog density detector 60 can be positioned along the fog circulation circuit. In the illustrated embodiment it is at the fog inlet 11 of the growth chamber 10. Any fog density detector can be employed. In a preferred embodiment it is an optical fog density detector comprising a light source 62 optically coupled with fog in the circulation circuit 1 and a photodetector 61 optically coupled with the light source. The fog density detector is coupled, e.g. electrically with fog-generator controller 70. The controller 70 is coupled, e.g. electrically with fog generating reservoir 20, and modifies fog generation in response to the measured fog density. The controller 70 can be coupled to transducer 25 to control the cycling or frequency thereof. Alternatively, the transducer 25 can operate continuously and the controller 70 can be coupled to flow regulator 32, whereby in response to an increase in fog density, additional gas can be combined with the circulating fog.

The density detector 60 can also be connected, e.g. electrically, to an alarm 64 to signal fog generation irregularity. Failure of the fog-generating system requires rapid response because tissue in the growth chamber 10 can become dehydrated and die. Rain can also occur in the fog circulation circuit. Rain creates rapid fluctuations in humidity. In the growth chamber 10 it also coats roots with water, which interferes with nutrient uptake. Careful monitoring and control of fog generation using the density detector 60 can stabilize the fog.

In the preferred embodiment of the optical fog density detector 60, the light source is an infrared light source. Water vapor strongly absorbs infrared light. Generally the concentration of nutrients or other solutes in the fog is insufficient to produce a readily detectable absorption and only water vapor is detected. A simple and inexpensive detector can be made using an infrared diode. To measure droplet size as well as fog density, the detector can utilize a laser, preferably an infrared laser. The laser in combination with the photodetector forms a particle detector which can measure the size of individual droplets. In lieu of a fog density detector, a humidity detector such as a wet thermometer can be positioned in the fog circulation circuit.

The nutrient concentration in an ultrasonically generated fog can be stabilized by the use of a ballast reservoir 80. Due to evaporation of water and precipitation of nutrients, the salt concentration in an ultrasonic fog-generating reservoir can increase to a level that is toxic to tissue. To maintain a suitable concentration of nutrient, frequent changes of the nutrient solution can be necessary. The frequency of the solution changes can be reduced by increasing the volume $V_f$ of the lower portion of the fog-generating reservoir. To generate fog from a large volume reservoir, e.g. of a size above about 1 liter, can require a greater number or size of ultrasonic transducers. For the case where the temperature of the growth chamber is maintained by controlling the temperature of the liquid nutrient, increasing the volume of the fog-generating reservoir also increases the response time of the thermal regulation. By circulating nutrient solution between a relatively small volume fog-generating reservoir, e.g. of a size no greater than about 250 ml, and a relatively larger volume ballast reservoir having a volume $V_b$, the frequency of solution replacement can be reduced without increasing the transducer requirement or the thermal response time.

Fog-generating reservoir 20 has a liquid outlet 24 that drains solution through solution return conduit 100 to inlet 83 of ballast reservoir 80. The returned solution mixes with the greater volume of the solution in the ballast reservoir. Fresh solution is supplied to the fog-generating reservoir through solution supply conduit 90 that connects ballast reservoir solution outlet 84 to fog-generating reservoir solution inlet 23. Ballast reservoir 80 is also equipped with deionized water inlet 82 connected to deionized water conduit 120 from which deionized water from deionized water supply 115 is provided to the system to make up for water lost through fog atomization and evaporation (vaporization). Up to approximately 450 ml per hour of water can be lost in this way. The necessity for supplying make-up deionized water is minimized when fog recirculation is in effect. The deionized water dilutes the nutrient solution but such dilution is adequately compensated for by ion exchange resin 91. Water level detector 81 operates the deionized water valve 116. The fog-generating reservoir 20, the ballast reservoir 80, and the solution supply and return conduits 90 and 100 form solution circulation circuit 2. Circulation can be promoted with pump 110. To maintain the correct nutrient content or pH, ion exchange resin 91 can be positioned in the solution circuit. In the illustrated embodiment the ion exchange resin is on the solution supply conduit 90. It can alternatively be positioned on the return conduit 100.

There can be a regulating valve at liquid outlet 24 to control the rate of circulation between the two reservoirs and maintain the liquid level in the fog-generating reservoir at optimum height for transducer function. The circulation rate can be controlled by pump 110. Either or both liquid reservoirs 20 and 80 and either or both liquid conduits 90 and 100 can include solution monitors, such as first, second and third solution monitors 85, 86 and 87. In this embodiment they are positioned in the ballast reservoir 80. The solution monitors can be any monitor of solution parameters such as temperature, composition and solution level. In a preferred embodiment they are electrically or chemically based. For example, one monitor can measure temperature, a second can be a pH-measuring electrode and a third can be a conductivity-measuring electrode. One or more of the solution monitors can serve as a solution replacement indicator. The decision to replace the solution can be based on criteria such as nutrient concentration, contaminant concentration or solution volume. The pump 110 can be connected to a pump controller 112 to activate the pump when necessary or control the pump speed. Preferred speeds are in the range of about 0.05 to about 20 l/hr. The pump controller 112 can be interfaced with a solution monitor such as a solution level monitor. The temperature of the nutrient solution can be controlled with heater/cooler 88. In this embodiment the temperature controller is positioned on the ballast reservoir 80. It can alternatively be positioned on the fog-generating reservoir 20. Controller 70 can operate heater/cooler 88 in response to input from a solution temperature monitor.

The volume of the ballast reservoir is greater than the volume of the fog-generating reservoir. Preferably the volume is large enough to re-dilute solution which has been concentrated by evaporation. The ballast volume is preferably at least 100 times greater than the generating reservoir volume, and more preferably several hundred times greater, e.g. about 500 times greater. In one embodiment reduced to practice, the fog-generating reservoir volume was 125 ml and the ballast reservoir volume was 30 l. The nutrient solution was circulated at the rate of 1 l/hr. The fog-generating system was operated continuously for one week before it was necessary to replace the nutrient solution. The nutrient solution in the ballast reservoir can be replaced without interrupting the operation of the fog-generating reservoir. Without the use of a ballast reservoir it was necessary to change the solution at least daily.

For fog stabilization, the recirculating fog aeroponic growth system is preferably used in combination with the fog density detector, and most preferably used in further combination with nutrient solution recirculation. Numerous combinations and variations of this invention will be readily apparent to those skilled in the art and fall within the spirit and scope of this invention.

We claim:

1. An aeroponic growth system comprising:

an aeroponic growth chamber having a fog inlet and a fog outlet;

a fog-generating system comprising a fog-generating reservoir, said reservoir adapted to be partially filled with a solution such that a lower portion of said reservoir is filled with solution and an upper portion of said reservoir is filled with fog, said upper portion having a fog inlet and a fog outlet, said lower portion having a volume $V_f$, said lower portion having an ultrasonic transducer positioned in contact with solution therein;

a fog supply conduit connected to said fog outlet of said fog-generating reservoir and connected to said fog inlet of said growth chamber;

a fog return conduit connected to said fog outlet of said growth chamber and connected to said fog inlet of said fog-generating reservoir;

said upper portion of said fog-generating reservoir, said fog supply conduit, said growth chamber and said fog return conduit forming a fog circulation circuit; and a fan positioned in said fog circulation circuit.

2. The growth system of claim 1 wherein said fan is positioned at said fog outlet of said growth chamber.

3. The growth system of claim 1 further including a gas inlet coupled with said fog circulation circuit, said gas inlet having a flow regulator connected thereto.

4. The growth system of claim 3 wherein said gas inlet is an air inlet.

5. The growth system of claim 3 further comprising an optical fog density detector, said fog density detector system comprising:

a light source optically coupled with said fog circulation circuit;

a photodetector optically coupled with said light source; and a fog-generator controller coupled with said photodetector and coupled with said flow regulator.

6. The growth system of claim 1 wherein said fog-generating reservoir further comprises:

a liquid outlet and a solution inlet and;

wherein said fog-generating system further comprises:

a ballast reservoir having a volume $V_b$ greater than $V_f$ and having an inlet and an outlet;

a solution supply conduit connected to said outlet of said ballast reservoir and connected to said inlet of said fog-generating reservoir; and a solution return conduit connected to said liquid outlet of said fog-generating reservoir and connected to said inlet of said ballast reservoir;

said fog-generating reservoir, said solution return conduit, said ballast reservoir and said solution supply conduit forming a solution circulation circuit.

7. A method of aeroponic growth for plant tissue comprising the steps of:

providing the aeroponic growth system of claim 1;

placing tissue in said growth chamber; and circulating fog through said growth chamber.

8. A concentration-stabilizing fog-generating system, comprising:

a fog-generating reservoir having a fog inlet and a fog outlet and a solution inlet and a liquid outlet therein, said fog-generating reservoir having an upper portion and a lower portion, said lower portion having volume $V_f$, said reservoir having an ultrasonic transducer positioned in said lower portion;

a ballast reservoir having a volume $V_b$ greater than $V_f$ and having an inlet and an outlet;

a solution supply conduit connected to said outlet of said ballast reservoir and connected to said inlet of said fog-generating reservoir; and a solution return conduit connected to said liquid outlet of said fog-generating reservoir and connected to said inlet of said ballast reservoir;

said fog-generating reservoir, said solution return conduit, said ballast reservoir and said solution supply conduit forming a solution circulation circuit.

9. The fog-generating system of claim 8 wherein $V_b$ is greater than about 100 $V_f$.

10. The fog-generating system of claim 8 further including a solution pump positioned in said solution circulation circuit.

11. The fog-generating system of claim 10 further including a pump controller connected to said solution pump.

12. The fog-generating system of claim 8 further including a regulating valve connected to said liquid outlet of said fog-generating reservoir.

13. The fog-generating system of claim 8 further including ion exchange resins positioned in said solution circulation circuit.

14. The fog-generating system of claim 8 further including a solution replacement indicator.

15. The fog-generating system of claim 8 further comprising a heater/cooler thermally coupled with said solution circulation circuit.

16. An aeroponic growth system comprising:

the fog-generating system of claim 8;

an aeroponic growth chamber having a fog inlet and a fog outlet;

a fog supply conduit connected to said upper portion of said fog-generating reservoir and connected to said fog inlet of said growth chamber;

a fog return conduit connected to said fog outlet of said growth chamber and connected to said upper portion of said fog-generating reservoir;

said upper portion of said fog-generating reservoir, said fog supply conduit, said growth chamber and said fog return conduit forming a fog circulation circuit; and a fan positioned in said fog circulation circuit.

17. A method of aeroponic growth for plant tissue comprising the steps of:

providing an aeroponic growth system comprising an aeroponic growth chamber and further comprising the fog-generating system of claim 8 coupled therewith;

placing tissue in said growth chamber; and flowing fog into said growth chamber.

18. An optical fog density detector system for use with a system having a fog generator, said detector comprising:

a light source adapted to be optically coupled with generated fog;

a photodetector optically coupled with said light source; and a fog-generator controller electrically coupled with said photodetector and adapted to be electrically coupled with said fog generator.

19. The fog density detector of claim 18 wherein said light source is an infrared light source.

20. The fog density detector of claim 18 further comprising an alarm electrically coupled with said photodetector.

21. The fog density detector of claim 18 wherein said fog generator comprises an ultrasonic fog generator having an ultrasonic transducer and wherein said controller is coupled with said transducer.

22. The fog density detector system of claim 18 wherein said controller and said detector are operatively connected to a computer.

23. An aeroponic growth system comprising:

an aeroponic growth chamber having a fog inlet and a fog outlet;

a fog-generating system comprising a fog-generating reservoir, said reservoir adapted to be partially filled with a solution such that a lower portion of said reservoir is filled with solution and an upper portion of said reservoir is filled with fog, said upper portion having a fog inlet and a fog outlet, said lower portion having an ultrasonic transducer positioned therein;

a fog supply conduit connected to said fog outlet of said fog-generating reservoir and connected to said fog inlet of said growth chamber;

a fog return conduit connected to said fog outlet of said growth chamber and connected to said fog inlet of said fog-generating reservoir;

said upper portion of said fog-generating reservoir, said fog supply conduit, said growth chamber and said fog return conduit forming a fog circulation circuit;

a fan positioned in said fog circulation circuit; and the fog density detector of claim 18 optically coupled with said fog circulation circuit.

24. The growth system of claim 23 further including a gas inlet coupled with said fog circulation circuit, said gas inlet having a flow regulator connected thereto, wherein said fog generator controller is coupled with said flow regulator.

25. A method for controlling the density of a generated fog comprising the steps of:

providing the fog density detector of claim 18;

providing a fog generator electrically coupled with said fog-generator controller of said fog density detector;

controlling said fog generator with said fog-generator controller to maintain the density of the generated fog at a desired level.

* * * * *